Figure 1:
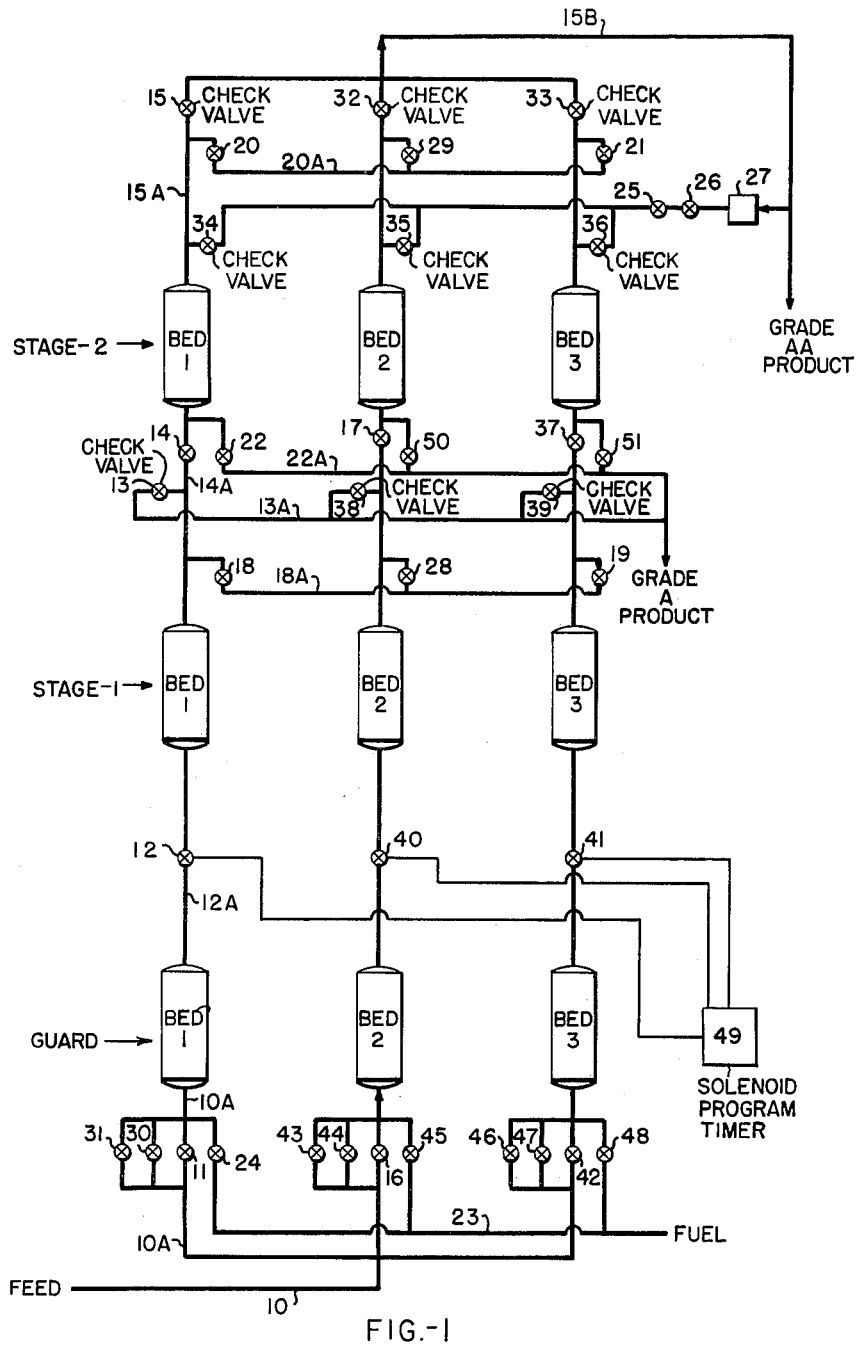

May 24, 1966

T. M. STARK 3,252,268

GAS SEPARATION BY ADSORPTION PROCESS

Filed April 1, 1963

2 Sheets-Sheet 1

Thomas M. Stark  Inventor

By David A. Roth

Patent Attorney

3,252,268
GAS SEPARATION BY ADSORPTION PROCESS
Thomas M. Stark, Morristown, N.J., assignor to Esso Research and Engineering Company, a corporation of Delaware
Filed Apr. 1, 1963, Ser. No. 269,490
19 Claims. (Cl. 55—25)

The instant invention relates to a process for obtaining high purity products. In particular, it relates to a specific combination of adsorbent zones operated in such a manner as to continuously produce both an ultra pure product and a moderately pure product, thus obtaining increased product efficiencies and yields. The preferred product is hydrogen. Even more specifically, the invention is directed to a combination of, and sequence of, adsorption and desorption processes where desorption is effected both by the reduction of pressure on adsorbent beds as well as by purging adsorbent beds.

It is now known according to the teachings of U.S. Patent 2,944,627 issued to C. W. Skarstrom, that an adsorbent, after substantial saturation with one or more components may be desorbed by reducing the partial pressure of that component in the atmosphere surrounding the adsorbent. U.S. Patent 2,944,627 also teaches that such desorptions by partial pressure reduction can be made more efficient by rapidly pressuring and depressuring so that the heat of adsorption is not allowed to dissipate throughout an adsorption bed and is available to contribute toward the desorption partial pressure effect.

The process of alternately adsorbing with high pressures and desorbing with low pressures is referred to herein as $\Delta P$ (delta pressure), i.e., $\Delta P$ cycles. In $\Delta P$ cycles, the pressure reduction at the beginning of the desorption step can be carried out in a variety of ways. For example, where the adsorption process is carried out for the purpose of obtaining a pure effluent, and where adsorption is conducted at superatmospheric pressure, the saturated adsorbent may be merely vented to the atmosphere. If it is desired to retain the adsorbed material, in such superatmospheric operation, the venting may be into a closed vessel thus permitting the recovery of adsorbed material. Passages or passageways through which bed pressures can be reduced can be located at any convenient place on the periphery of the bed or adsorption zone.

Moreover, whether adsorption is conducted at superatmospheric, subatmospheric or atmospheric pressure, desorption can be accomplished by use of a vacuum.

The use of the above-described desorption technique has advantages over thermal cycles. Primarily their advantages are the elimination of heating and cooling. A fast cycle can be employed because no time is required for heating and cooling the bed.

In essence, heatless adsorption is a solid adsorbent, gaseous, separation process involving continuous cyclic operation without application of external heat for regeneration of the adsorbent. This "heatless" aspect is attained by using the generated heat of adsorption as the thermal driving force in the regeneration step. Removal of adsorbed gas from the bed during regeneration is achieved by lowering pressure and sweeping the adsorbent with a purge stream of product.

Although there is substantially no net transfer of heat to and from the beds in the preferred method of operation it will be understood that control of the ambient temperature is contemplated. Thus, the adsorbent beds can be surrounded by a heat transfer medium so as to control ambient temperature. Alternatively, heating or cooling means can be provided directly within the adsorbent bed. Such means, for example, can be conducting means for electric current or conduit means for carrying a heat transfer medium directly within the adsorbent bed.

It follows that when the ambient temperature of the bed is controlled, then the temperature of the feed or other gases passing through the beds should be close to that ambient temperature.

Thus, if it were desired to carry out an adsorption process of the invention for a feed at 600° F., the beds themselves would be preferably heated by external means to 600° F.

Although the use of the processes which depend on what are referred to as the heatless adsorber principle have recently become well established, it has not hitherto been possible to obtain large quantities of an *ultra* pure product as well as large quantities of a moderately pure product. It has now been discovered, and forms the substance of this invention, that by combining at least two adsorbent zones in a certain series and parallel relationship both an *ultra* pure product as well as a moderately pure product can be obtained.

In brief, the combination of adsorbent zones is preferably in two stages but may also be in 3 or more stages. Each stage has one or more adsorbent zones. In one preferred embodiment of the invention, the first stage has three substantially identical adsorbent zones and the second stage also has three substantially identical adsorbent zones. The adsorbent zones in each stage are connected with a series of interconnecting conduits (pipes) with suitable valving. Generally if there is more than one adsorbent zone in a stage, the zones will have a parallel relationship with each other, while the zone or zones in one stage bear a series relationship with a zone or zones in the other stage.

A typical operation of the process of the invention with three adsorbent zones in each of the stages is as follows. Each adsorbent bed or zone has a feed end and a product end. A feed containing as little as 5% of the desired component is introduced into the feed end of the first adsorbent bed of the first stage. The effluent from the product end of the first bed of the first stage contains a large percentage of the desired product. The effluent from the product end of the first stage bed is divided into two portions. One portion goes to a moderately pure product line for blending with depressure gas from the second stage. The second portion is introduced into the feed end of the first bed of the second stage. The effluent from the product end of the first bed of the second stage is an ultra pure product which will be referred to herein as a Grade AA product. The moderately pure product will be referred to here as a Grade A product. A portion of the ultra pure product effluent emerging from the product end of the first bed of the second stage is used to purge the first bed of the second stage.

But prior to such purging step, the first bed of the second stage is depressured at the feed end to allow some of the adsorbed material to come off as depressure gas. A portion of this depressure gas is used as a component of the moderately pure product, i.e., Grade A product. The product purge introduced into the product end of the first bed of the second stage, then desorbs the remainder of the adsorbed material. Thus, the first portion of depressure gas from stage 2 plus a portion of the product effluent from stage 1 makes up the Grade A product.

The remaining portion of the depressure gas from bed 1-stage 2 and purge effluent from bed 1-stage 2 exits from the feed end of bed 1-stage 2 and is used to purge 1-stage 1. The purge of bed 1-stage 1 is carried out after the pressure has been reduced in bed 1-stage 1.

The above is a very brief description of a basic process sequence as applied to the #1 beds of the first and second stage and it will be understood that essentially the same process sequence except for bed pressure equalization would be employed if the two stages employed 2 or more beds. Preferably three beds are used in each stage so as to have a continuous product flow. When two or more beds are used in each stage then preferably bed pressure equalization through the product ends of the beds is carried out prior to depressuring. Bed pressure equalization can be carried out from product end to feed end or from feed end to product end or from feed end to feed end. Generally from product end to product end is preferred. Beds 1, 2 and 3 of the first stage are in a parallel relationship with each other as are beds 1, 2 and 3 of the second stage. However, the identically numbered beds of each stage are in a series relationship with each other.

Additionally, depending to a certain extent on the type of feed employed, a guard bed or guard beds can also be used between the raw feed stream and the bed or beds of the first stage. Charcoal is preferably used as an absorbent when $H_2$ is the desired product. The guard bed will preferably contain a wide pore silica gel to prevent contaminants such as $C_3+$ hydrocarbons from reaching the charcoal adsorbent. Such hydrocarbons are difficult to desorb from charcoal. The adsorbent in the guard bed will vary depending on the feed and contaminant.

An important feature of the instant invention is the minimization of product loss in the depressure gas. It was discovered that the first portion of gas obtained during depressuring at the product end, i.e., in the same direction as feed flow during adsorption is rich in desired product, e.g., hydrogen. Thus, when this depressure gas is used to partially repressure a bed just completing a low pressure purge, substantial product is prevented from being lost from the beds.

In operation, a low pressure bed and a high pressure bed are connected, preferably at their product ends. The pressure between them is then allowed to equalize. This is bed pressure equalization. Although product end bed pressure equalization is preferred, feed end bed pressure equalization can also be used. Moreover, beds can have their pressures equalized by connecting the feed end of one bed to the product end of another.

Although the instant invention can be used generally to obtain Grade AA and Grade A product from many different feed streams, the invention will be described with reference to a specific embodiment with respect to obtaining Grade AA hydrogen having a purity of about 99.995% and Grade A hydrogen having a purity of 99%. Almost any type of feed can be employed even those containing as little as 15% hydrogen. The feeds can contain hydrocarbons as impurities or they can have non-hydrocarbon impurities such as Co, $H_2O$, $CO_2$, $H_2S$, $N_2$, air and the like. The gases containing $H_2$ can be industrial type gases such as producer gas, blue gas, the gas from the iron steam reaction, gas from the water-gas reaction, thermal decomposition of hydrocarbons, synthesis gas, $NH_3$ decomposition gases and the like.

It is contemplated that one of the most advantageous uses of the invention will be to utilize hydrocarbon and hydrogen feeds such as recycle gas or powerformer tail gas, fuel gas, catalytic cracking off gas, and the like. When using, gases having appreciable quantities of low molecular weight hydrocarbons such as powerformer recycle gas or tail gas, not only can a Grade AA product and a Grade A product be obtained, but a third product, fuel, can also be obtained.

Tail gas is an uncondensed reaction effluent from a hydroforming reaction. A typical tail gas comprises a major proportion of hydrogen, i.e., about 72.5 vol. percent. The balance of a typical tail gas is made up of light hydrocarbons in the $C_1$ to $C_4$ range although there can be some $C_5+$. Normally such light hydrocarbons will make up less than 50 vol. percent of the tail gas. Utilizing the process of the invention with powerformer adsorber-stripper off-gas, a recovery of 99+% purity hydrogen was over 70%. The process can produce hydrogen as pure as 99.99% at pressures from 100 to 500 p.s.i.g. from feeds containing from 30 to 99.5% hydrogen with hydrogen recoveries as high as 85%.

The invention can be fully understood by referring to both the preceding and the following descriptions, the claims taken in conjunction herewith and by the accompanying drawings wherein FIGURE 1 is a schematic diagram of a process suitable for carrying out a preferred embodiment of the inventive technique with three adsorption zones in each stage.

Figure 2:
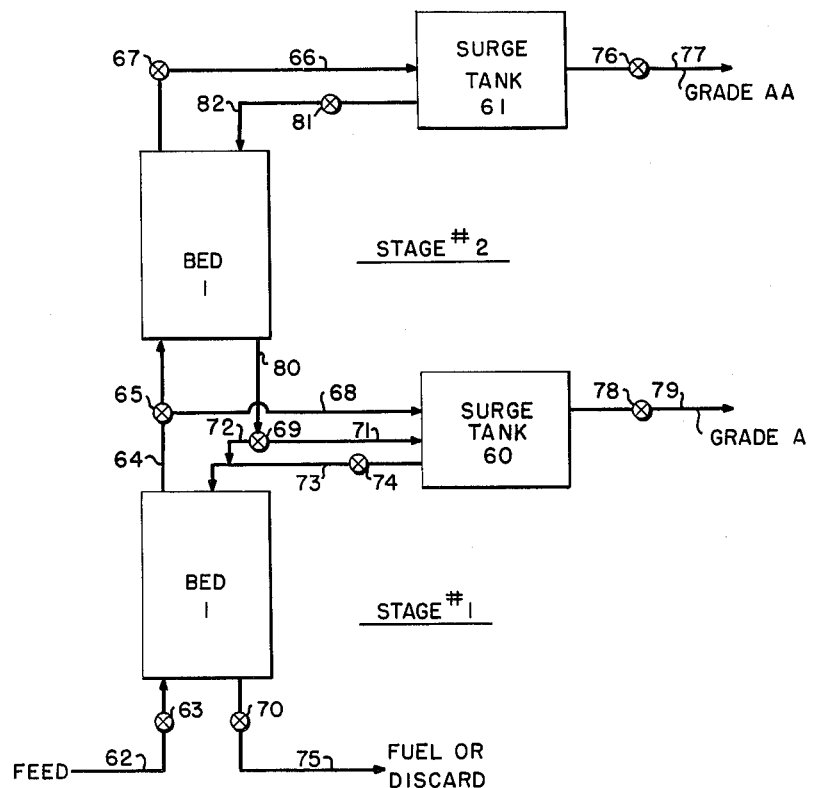

FIGURE 2 is a schematic diagram of a process suitable for carrying out a preferred embodiment of the inventive technique using one adsorption zone in each stage.

Powerformer tail gas from a powerformer absorber-stripper is flowed through lines 10 and 10A and through automatic valve 11 to guard bed 1. Guard bed 1 is made up of wide pore silica gel having a pore size of about 120 to 160 A., e.g., 135 to 145 A., which removes the $C_5+$ material from the feed stream so as to prevent contamination of the adsorbent in the main adsorbent beds. The adsorbent of the main adsorbent beds is preferably charcoal.

The $C_5-$ product from guard bed 1 enters the stage 1-bed 1 absorbent bed, through automatic valve 12 and line 12A. A portion of the effluent product from the stage 1-bed 1 adsorbent bed containing 99.0% $H_2$ is taken off through check valve 13 and conveyed through line 13A to the Grade A product line. The remaining part of the product from stage 1-bed 1 enters stage 2-bed 1 through automatic valve 14 and line 14A. The product from stage 2-bed 1 containing 99.995% hydrogen passes through line 15A check valve 15, and line 15B to the Grade AA product line.

The bed 1 adsorbers of both stages remain on the adsorption portion of the cycle for 4 minutes and 10 seconds before they are taken offstream for regeneration. After this period, the bed 1 adsorbers will be spent and the bed 2 adsorbers of both stages are automatically substituted for them. The bed 3 adsorbers of both stages are substituted for the bed 2 adsorbers after another 4 minutes and 10 seconds have passed. Each adsorber is, therefore, on adsorption for 4 minutes and 10 seconds before it is regenerated. Therefore a complete cycle is accomplished in 12 minutes and 30 seconds.

The #2 adsorbers of both stages are substituted for the #1 adsorbers of both stages by opening automatic valves 16 and 17 and closing automatic valves 11 and 14. The first phase of the #1 adsorber regeneration recovers some of the high purity hydrogen in the #1 adsorbers by depressuring and equalizing the pressure between them and the #3 adsorbers which at this stage of the cycle are at 0 p.s.i.g. Before this bed pressure equalization step (BPE) is accomplished, guard bed #1 is isolated from bed 1-stage 1 by closing automatic valve 12. During the BPE step, valve 24 is opened and guard bed #1 begins to depressure into line 23. Bed 1-stage 2 is isolated from bed 1-stage 1 by closing automatic valve 14. The BPE step between the bed 1-stage 1 and bed 3-stage 1 adsorbers is initiated by opening automatic valves 18 and 19. This allows depressure gas to flow through line 18A. The BPE step between bed 1-stage 2 and bed 3-stage 2 is initiated by opening automatic valves 20 and 21. This allows depressure gas to flow through line 20A. These valves are closed at the completion of the BPE step.

Following the BPE step the gas pressure in bed 1-stage 2 has been reduced from about 190 p.s.i.g. to about 95 p.s.i.g. The hydrogen gas remaining in bed 1-stage 2 has a relatively high purity. This gas is recovered by depressuring bed 1-stage 2 to the 0 p.s.i.g. $H_2$ product line through line 22A by opening automatic valve 22. At about 70 p.s.i.g. valve 22 closes. While valve 22 is open, valves 12 and 24 are also open and guard bed #1 and bed 1-stage 1 are depressuring to line 23. When valve 22 closes, valve 14 opens and the #1 beds of stage 2 and stage 1, and guard bed #1 continue to depressure in series into line 23. The additional quantities of gas in guard bed #1, bed 1-stage 1 and bed 1-stage 2 are depressured to fuel gas line 23 by opening automatic valves 14, 12 and 24.

When the pressure in the three #1 beds has reached that of fuel line 23, automatic valve 25 is opened to allow a portion of the high purity product from the bed 2-stage 2 adsorption beds, now onstream, to purge remaining hydrocarbons from the charcoal and silica gel in the #1 adsorption beds. This purge stream is controlled by hand control valve 26 and rotameter 27.

At the completion of the above purge step, automatic valves 25 and 24 are closed and the first and second stage #1 adsorbers and the #1 guard are ready to be repressured in preparation for going back on adsorption cycle. The two #1 bed adsorbers are isolated from each other by closing automatic valve 14.

The repressuring operation is initiated by a BPE step between the #1 adsorbers at fuel line pressure and the #2 adsorbers that have just been taken out of adsorption service. (The #3 adsorbers are now onstream.) The BPE step between the #1 and #2 beds in the first stage is initiated by opening automatic valves 18 and 28. The BPE step between the #1 and #2 adsorbers in the second stage is initiated by opening automatic valves 20 and 29. These valves are closed at the completion of the BPE step.

The final repressuring of the first stage adsorption beds and guards is accomplished with feed in a two-stage pressuring operation. The opening of automatic valve 30 initiates the repressuring operation and allows it to proceed at a controlled rate. When the pressure in the bed 1-stage 1 adsorber has been raised so as to reduce the repressuring rate, automatic valve 31 is opened to decrease the flow resistance and complete the repressuring. Two-stage repressuring is preferably utilized to minimize possible charcoal attrition.

The final repressuring of the second stage adsorption units is accomplished with high purity $H_2$ product as, for example, from the bed 3-stage 2 adsorber now onstream by opening automatic valves 20 and 21 to bring bed 1-stage 2 to adsorption pressure. Valves 20 and 21 are then closed. Second stage feed may also be used for final repressuring of the second stage.

At this step in the cycle, the #1 adsorbers and #1 guard bed have been regenerated and repressured and are ready to be returned to absorption service in place of the now spent #3 adsorbers.

Check valves 32 and 33 are similar in function to bed 2-stage 2 and bed 3-stage 2 as check valve 15 is to bed 1-stage 2. Check valves 34, 35, and 36 permit the flow of high purity product from valves 25 to purge stage 2 beds #1, #2, and #3. Valve 37 is to bed 3-stage 2 as valve 14 is to bed 1-stage 2 and valve 17 is to bed 2-stage 2. Valves 38 and 39 are to stage 2-beds 2 and 3, as valve 13 is to bed 1-stage 2. Valves 40 and 41 are to beds #2 and #3 of stage 1 as valve 12 is to bed 1-stage 1. Valve 42 is to guard bed #3 as valves 11 and 16 are to guard beds #1 and #2. Valves 43, 44, 45 and valves 46, 47 and 48 are to guard beds #2 and #3 as valves 31, 30 and 24 are to guard bed #1. Valves 50 and 51 are to bed 2-stage 2 and bed 3-stage 2 as 22 is to bed 1-stage 2.

The valves in FIGURE 1 other than the check valves are two-way solenoid valves. They are operated in a predetermined timing sequence from electric solenoid program timer 49. Wiring is conventional and need not be shown.

It will be understood that although the above description of the operation does not detail in full the operation of every bed, the operation of the beds not detailed will be completely apparent by analogy.

Both stage 1 and stage 2 each having three beds use a 4 min. 10 sec. adsorption time per bed as well as a 4 min. 10 sec. depressure and purge time for each bed and a 4 min. 10 sec. time to repressure. For a typical operation wherein adsorption pressure is 190 p.s.i.g. and purge pressure is 0 p.s.i.g. there will be a sequence of timed or programmed events taking place on each bed during each 4 min. 10 sec. cycle. These sequences have three components. These are (1) adsorption, (2) BPE, dump, purge, and (3) BPE, repressure. Typical programmed integrated cycle time relations are shown in Table I.

TABLE I

| Bed 1 | Step: | Adsorption | | BPE | Dump | Purge | BPE | Repressure |
|---|---|---|---|---|---|---|---|---|
| | Press: psig | 190 | | 190→95 | 95/0 | 0 | 0→95 | 95→190 |
| | Time (min.) | 0 | 2 | 4 | 6 | 8 | 10 | 12 |

| Bed 2 | Step: | BPE | Dump | Purge | BPE | Repressure | Adsorption | |
|---|---|---|---|---|---|---|---|---|
| | Press: psig | 190→95 | 95/0 | 0 | 0→95 | 95→190 | 190 | |
| | Time (min.) | 0 | 2 | 4 | 6 | 8 | 10 | 12 |

| Bed 3 | Step: | BPE | Repressure | Adsorption | | BPE | Dump | Purge |
|---|---|---|---|---|---|---|---|---|
| | Press: psig | 0→95 | 95→190 | 190 | | 190→95 | 95/0 | 0 |
| | Time (min.) | 0 | 2 | 4 | 6 | 8 | 10 | 12 |

The material balance for a typical unit of the preferred embodiment is as follows in Table II below.

TABLE II
*Material balance*

| Stream | Rate (s.c.f.h.) | Pressure (p.s.i.g.) | Composition (percent $H_2$) |
|---|---|---|---|
| Feed | 82,000 | 190–230 | 83 |
| 99.5% Product: | | | |
|   Feed to Stage 2 | 40,700 | 190–230 | 99.5 |
|   99% Product | 18,800 | 190–230 | 99.5 |
|   Total | 59,500 | 190–230 | 99.5 |
| 99% Product | 24,000 | 40 | 99 |
| 99.995% Product | 24,000 | 2,500 | 99.995 |
| Fuel:[1] | | | |
|   Depressure Portion | 22,500 | 0 | 60 |
|   Purge Portion | 11,500 | 0 | 60 |
|   Total | 34,000 | 0 | 60 |
| Depressure plus Purge:[2] | | | |
|   Depressure Portion | 7,300 | 0 | 98.5 |
|   Purge Portion | 4,200 | 0 | 98 |
|   Total | 11,500 | 0 | 98.5 |
| Depressure Product[3] | 5,200 | 40 | 98.5 |
| Purge (1.4 vol. percent Purge/Feed) | 4,200 | 0 | 99.995 |

[1] Depressure and purge effluent from stage 1.
[2] From stage 2 into stage 1.
[3] From stage 2.

Typical bed sizes and other process data for the preferred embodiment described are itemized below in Table III.

TABLE III
*Bed sizes and process data for preferred unit*

| | Stage 1 | Stage 2 |
|---|---|---|
| $H_2$ Recovery (percent) | 85 | 59 |
| Product Rate (s.c.f.h./lb.) | [3] 8.1 | 2.5 |
| Product Flow (s.c.f.h.) | 59,500 | 24,000 |
| Char Loading [1] (Lb./bed) | 2,460 | 3,180 |
| Char Volume (Ft.³/Bed) | 98 | 127 |
| Guard Loading [2] (Lb./Bed) | 1,650 | |
| Guard Volume (Ft.³/Bed) | 64 | |

[1] Columbia Grade ACC 6x14 mesh activated carbon (1,100 m.²/gm. surface area).
[2] Davison Grade 70 6x14 mesh silica gel (340 m.²/gm. surface area).
[3] Based on total adsorbent in 3 beds.

It will be understood that the exact process conditions under which the concept of the invention can be carried out will vary depending on the absorbent, feed stock, desired purity and other adjustable factors which will be apparent to one skilled in the art.

For hydrogen recovery of relatively high purity from a hydrocarbon feed stream, the following conditions are set forth as a guide.

| | Operating | Preferred | Especially Preferred |
|---|---|---|---|
| Charcoal pore diam. A | 20 to 200 | 20 to 60 | 20 to 40 |
| Silica gel pore diam. A | 100 to 200 | 110 to 180 | 120 to 160 |
| Percent $H_2$ in Feed | 5 to 99.99 | 40 to 95 | 50 to 90 |
| Percent $H_2$ in Grade A Product | 90 to 99.9 | 95 to 99.5 | 98 to 99 |
| Percent $H_2$ in Grade AA Product | 99.99 to 99.9999 | 99.995 to 99.998 | 99.995 to 99.998 |
| Adsorption Pressure, p.s.i.g. | 15 to 1,000 | 75 to 750 | 100 to 500 |
| Product Flow Rate, s.c.f.h. | 1 to 1,000,000 | 10 to 500,000 | 1,000 to 200,000 |
| Cycle Time, min | 1.5 to 30 | 10 to 20 | 12.5 to 15.0 |
| Temperature, °F | −350 to 1,000 | 40 to 150 | 70 to 120 |
| Depressure Time, min | 0.1 to 10 | 0.5 to 5 | 1 to 3 |
| Repressure Time, min | 0.1 to 10 | 0.5 to 5 | 1 to 3 |

For the purposes of this application the terms adsorption, BPE, dump, purge and repressure will have the following meanings:

*Adsorption.*—When product effluent is actually exiting from an adsorption zone as well as material being adsorbed within the zone, i.e., on the adsorbent in the zone.

*BPE—bed pressure equalization.*—When two beds or adsorbent zones at different pressures are connected together to result in the equalization of the pressures within both. Usually adsorbed material from the bed or zone at high pressure will flow over and be adsorbed on the bed or zone at lower pressure. This material is referred to as depressure gas. BPE (decrease) refers to the bed or zone which decreases in pressure. BPE (increase) refers to the bed or zone which increases in pressure.

*Dump.*—When the pressure within a bed or zone is lowered to the lowest pressure of a cycle, usually resulting in the exiting of formerly adsorbed components from the bed or zone. These components are also referred to herein as *depressure gas*. Also called *depressuring*. Depressure gas can be either collected as product, used to purge another bed, or discarded.

*Purge.*—Carried out at the lowest pressure of the cycle after the bed or zone has been subjected to a BPE (decrease) and a dump. When a material, usually richer in nonadsorbable constituents than the feed to the zone, is flowed countercurrently to feed direction so as to cause adsorbed components within the zone to exit with it. This occurrence is purging. The material rich in nonadsorbed constituents is the purge gas both as it goes in and as it comes out of a bed or zone.

*Repressure.*—Raising the pressure of a zone or bed to the adsorption pressure of an adsorption cycle. In the preferred process of the invention repressure of the first stage is done with feed and takes place in a bed or zone after the BPE (increase) step. Repressure of the second stage is done with product. However, it is possible to repressure either stage with feed or product.

Although the process of the invention is particularly adapted to two stages with three adsorption zones each, it can also be carried out with one, two or more beds (zones) in each of the stages. Multiple zones in each stage are convenient since continuous product flow can be obtained and various storage vessels and other equipment can be eliminated. The number of beds per zone will depend on the complexity of the cycle and other factors apparent to one skilled in the art.

For instance, FIGURE 2 shows a preferred embodiment of two stages, each of which has a single bed. There is a surge tank 60 for both stages and a surge tank 61 for stage #2. In operation, feed flows through line 62 and valve 63 into bed 1-stage 1. The feed comprises about 50% $H_2$ and the major portion of the remainder is $C_1$ to $C_7$ hydrocarbons. If there are large quantities of $C_5$ or above hydrocarbons, a wide pore, e.g., 140 A. silica gel guard bed is preferably used to take out these higher molecular weight hydrocarbons so as to avoid contaminating the main adsorbent beds.

Bed 1-stage 1 is pressured up to adsorption pressure with the feed. Effluent starts to come out of bed 1-stage 1 and at this time it is considered to be on adsorption. The effluent flows through line 64 and valve 65 to bed 1-stage 2. An extremely pure product comes out of stage #2 bed and flows through line 66 and valve 67 to surge tank 61. This process is continued until just before breakthrough of adsorbable components of the feed. If desired, a portion of effluent from stage #1 can be conveyed through line 64, valve 65 and line 68 to surge tank 60.

At breakthrough, valves 65 and 67 are closed. Valve 69, which is a three-way valve, and valve 70 are opened so as to allow the beds of both stages to depressure to the low pressure of the cycle. The first portion of depressure gas from stage #2 will go to surge tank 60 via valve 69 and line 71. The first portion of depressure gas is the purest portion. The remainder of the depressure gas, i.e., the less pure portion, from stage #2 can be conveyed directly to stage 1 as purge gas through line 80, valve 69 and lines 72 and 73. Additional purge gas for stage 1 can be supplied from surge tank 60 through line 73 and valve 74.

The discharge from stage 2 which is caused by the purging of stage 2 by product effluent coming out of surge tank 61 and through valve 81 and line 82 through stage 2 and out line 80, is flowed through line 80, valve 69, line 72 and line 73 into bed #1 of stage 1 where it also aids in purging bed 1-stage 1 at low pressure.

Before bed 1 of stage 1 is purged as described above, valve 70 is opened to allow depressure gas to come off bed 1-stage 1 through line 75. This gas can be used as fuel or discarded, depending on its composition.

Valve 76 is opened occasionally to allow withdrawal of Grade AA product from surge tank 61 through line 77.

Valve 78 is opened occasionally to allow withdrawal of Grade A product from surge tank 60 through line 79.

Grade A product is generally a combination of the first portion of depressure gas from bed 1-stage 2 and product gas from bed 1-stage 1.

It will be appreciated that a guard bed containing an adsorbent such as silica gel can be used in feed line 62 to prevent the beds of stage #1 and stage #2 from becoming contaminated by hydrocarbons having four or more carbon atoms or other impurities difficult to desorb from the main adsorbent beds. The invention will be further illustrated by the following examples.

EXAMPLE 1

In order to show that the depressuring step is an effective technique for minimizing the loss of product in the depressure gas, the following experiment was carried out. Beds containing charcoal adsorbent were on adsorption cycle until breakthrough of hydrocarbons using a feed as will be hereinafter described at a pressure of 500 p.s.i.g. The beds were depressured to various pressures ranging from 400 p.s.i.g. to 50 p.s.i.g. The results are summarized in the following table.

TABLE IV

| Depressure from 500 p.s.i.g. to— | Avg. Comp. of Gas, Percent | |
|---|---|---|
| | $H_2$ | $CH_4$ |
| 400 | 99 | 1 |
| 300 | 97 | 3 |
| 200 | 95 | 5 |
| 100 | 94 | 6 |
| 50 | 93 | 7 |

Feed: 80% $H_2$, 7% $C_1$, 7% $C_2$, 6% $C_3$ at 500 p.s.i.g.

It was observed in the above test that the first portion of gas obtained when depressuring in the *same direction* as the feed during adsorption was larger in hydrogen than the feed. This was due to the difference between the charcoal's capacity for hydrogen and hydrocarbon and the relatively slower rate of hydrocarbon desorption. The above results demonstrated this and showed that the depressure gas hydrogen content was from about 93–99% when using a 80% hydrogen content feed. Thus, by connecting the outlet end, i.e., product end of two beds following a low pressure purge step on one bed and allowing them to pressure equalize with upflow bed pressure equalization, i.e., product end bed pressure equalization, about half of the hydrogen previously lost in depressure gas could be recovered.

EXAMPLE 2

In this example the efficiency of the bed pressure equalization step was demonstrated in a continuous cyclic operation. Runs using bed pressure equalization were compared with runs with no bed pressure equalization. The runs were performed at an adsorption pressure of 500 p.s.i.g., a desorption pressure of 0 p.s.i.g., a temperature of 100° F. for both adsorption and desorption and a 8 min. 20 sec. cycle. The feed contained 80% hydrogen and the product had a purity of 99.9% hydrogen. It was discovered that hydrogen recovery was increased from a valve of about 60% to about 75%. This corresponds approximately to the predicted savings of one-half of the usual depressure gas losses. The product rate was about 21 s.c.f.h./lb. for both bed pressure equalization and non-bed pressure equalization. The explanation for this is that in conventional downflow, i.e., feed end depressuring the gas obtained is approximately of feed composition. By conserving one-half of this gas with the BPE step the feed rate to the unit will be reduced correspondingly. Bed pressure equalization does result in interruption of product flow during the equalization step but continuous product flow can be obtained anyway by using three adsorption beds or zones in each stage.

Although the invention has been described with a certain amount of particularly, it will be understood that numerous variations and modifications in detail can be effected without departing from the spirit of the invention as set forth in the following claims.

What is claimed is:
1. In separation processes utilizing the principles of heatless adsorption wherein adsorption of at least one component of a feed stream at a relatively high pressure and desorption of adsorbed component of said feed at a relatively lower pressure is carried out in an adsorption zone, the improvement which comprises in combination:
   (a) Flowing a feed stream into adsorbent zone A, said zone A being selective for at least one component of said feed stream and allowing an effluent to emerge from said adsorbent zone A.
   (b) Flowing at least a portion of said effluent from said zone A as feed effluent into adsorbent zone B, said zone B being selective for at least one component of said feed effluent and allowing a primary effluent to emerge from said zone B.
   (c) Desorbing said adsorbent zone B by first lowering the pressure within said adsorbent zone B to obtain a depressure gas and then purging said zone B with a portion of said primary effluent from said zone B to obtain a purge effluent.
   (d) Desorbing said adsorbent zone A by first lowering the pressure within said adsorbent zone A and subsequently purging said zone A with a purge comprising a portion of depressured gas from zone B.
   (e) Collecting as a first moderately pure product stream a stream comprising the effluent of zone A and the depressure gas from zone B, and collecting as a second relatively very pure product stream the effluent of zone B.

2. A method according to claim 1 wherein said feed stream comprises hydrocarbons and $H_2$.

3. A method according to claim 2 wherein said feed stream comprises a major proportion of $H_2$.

4. A method according to claim 1 wherein in subparagraph (c) said pressure is lowered to a pressure intermediate said relatively high pressure and said relatively low pressure within said zone B by connecting zone B to adsorbent zone C, said adsorbent zone C being at said relatively low pressure and subsequently said zone B is depressured to said relatively low pressure from said intermediate pressure by venting said zone B to said relatively low pressure, the resulting depressuring causing substantial quantities of adsorbed constituents within said zone B to exit from said zone B as depressure gas.

5. A method according to claim 4 wherein in said subparagraph (d) said pressure is first lowered to a pressure intermediate said relatively high pressure and said relatively low pressure by connecting zone A to adsorbent zone D to cause some transfer of adsorbed components from said zone A, said adsorbent zone D being at said relatively low pressure, and subsequently depressuring zone A to said relatively low pressure by venting said zone A to said relatively low pressure, the resulting depressuring causing substantial quantities of remaining adsorbed constituents within said zone A to exit from said zone A as depressure gas.

6. A separation process utilizing adsorbent zones A, B, C, D, E and F wherein adsorbent zones A, B and C are in stage 1 and adsorbent zones D, E and F are in stage 2 which comprises in combination:
 (a) Adsorbing a feed stream in zones A and D and withdrawing effluent from zones A and D at a relatively high pressure while simultaneously
  (1) Reducing a relatively high pressure in zones B and E to an intermediate pressure by connecting said zones B and E to said zones C and F respectively, said zones C and F being at an initially relatively low pressure wherein the pressure in said zones C and F is raised to an intermeidate pressure;
  (2) Reducing the pressure of said zones B and E from said intermediate pressure to a relatively low pressure;
  (3) Purging said zones B and E while zones C and F are being repressured from an intermediate pressure to a relatively high pressure;
 (b) Reducing said relatively high pressure in zones A and D to an intermediate pressure by connecting said zones A and D to zones B and E wherein the pressure in said zones B and E is raised to an intermediate pressure, then reducing said intermediate pressure within said zones A and D to said relatively low pressure, purging said zones A and D, and
  (1) Repressuring said zones B and E to a relatively high pressure while the intermediate pressure reduction and purge are taking place in said zones A and D;
  (2) Adsorbing a feed stream on and withdrawing effluent from zones C and F at a relatively high pressure;
 (c) Repressuring said zones A and D to an intermediate pressure by connecting said zones A and D to said zones C and F, said zones C and F being reduced from a relatively high pressure to said intermediate pressure, then repressuring said zones A and D to said relatively high pressure, while
  (1) Adsorbing a feed stream on and withdrawing effluent from zones B and E;
  (2) Reducing said intermediate pressure within said zones C and F to a relatively low pressure;
  (3) Purging said zones C and F;
wherein said feed stream for the said zones in said stage 2 is the withdrawn effluent from the zones in said stage 1 and wherein further a first moderately pure product stream is collected from the adsorbent zones of stage 1, said first product stream comprising the effluents obtained from said adsorbent zones of stage 1 and the depressure gases obtained from the adsorbent zones of stage 2; and a second relatively pure product stream is collected from the adsorbent zones of stage 2.

7. A method according to claim 6 wherein said feed stream for stage 1 zones comprises $H_2$.

8. A method according to claim 7 wherein said feed stream comprises hydrocarbons and $H_2$.

9. A method according to claim 7 wherein said feed stream comprises a major proportion of $H_2$.

10. A method according to claim 8 wherein said feed stream prior to entering stage 1 adsorbers passes through an adsorbent selective to hydrocarbons having more than four carbon atoms.

11. A method according to claim 10 wherein said adsorbent is a wide pore silica gel having a pore diameter of from 100 to 200 A.

12. A separation process utilizing a feed and adsorbent zones A, B, C, D, E, and F wherein adsorbent zones A, B and C are in a first stage and adsorbent zones D, E and F are in a second stage and wherein all of said zones are interconnected, the zones of each stage being in a substantially parallel relationship with each other and zones A, B and C being in a series relationship with zones D, E and F respectively wherein zones A and D, B and E, C and F can be considered as zone pairs each of said zone pairs being subjected to three equal length but discrete cycles, said cycles consisting of (1) an adsorption cycle, (2) a bed pressure equalization to lower pressure to an intermediate level, a dumping to lower the intermediate pressure to a relatively low pressure resulting in a depressure gas and a purging, and (3) a bed pressure equalization to raise pressure to an intermediate level from a relatively low pressure by bed pressure equalization and subsequently raising such intermediate level pressure to a relatively high pressure by using fed wherein at any given instant each of said zone pairs are on a different cycle, D, E and F is effluent from said zones A, B and C and wherein further a first moderately pure product stream is collected from the adsorbent zones of stage 1, said first product stream comprising the effluents obtained from said adsorbent zones of stage 1 and the depressure gases obtained from the adsorbent zones of stage 2; and a second relatively pure product stream is collected from the adsorbent zones of stage 2.

13. A process according to claim 12 wherein said bed pressure equalization is carried out by connecting a zone at relatively high pressure with a zone at relatively low pressure.

14. A process according to claim 12 wherein said purge with respect to zones D, E, and F is a portion of primary effluent from said zones.

15. A method according to claim 12 wherein said purge with respect to stage 1 is made up of depressure gas and purge effluent from the second stage.

16. A process according to claim 12 wherein said feed used for stage 1 zones comprises $H_2$.

17. A process according to claim 12 wherein said feed used for stage 1 zones comprises $H_2$ and hydrocarbons.

18. A process according to claim 12 wherein said relatively high pressure is attained by using product.

19. A process according to claim 1 wherein said zones A is purged with a purge comprising a portion of purge effluent from zone B and wherein said first moderately pure product stream comprises the effluent of zone A and purge effluent from zone B.

References Cited by the Examiner
UNITED STATES PATENTS

| | | | |
|---|---|---|---|
| 2,944,627 | 7/1960 | Skarstrom | 55—62 |
| 3,086,339 | 4/1963 | Skarstrom et al. | 55—62 X |
| 3,102,013 | 8/1963 | Skarstrom | 55—62 X |

FOREIGN PATENTS

| | | |
|---|---|---|
| 860,311 | 2/1961 | Great Britain. |

REUBEN FRIEDMAN, *Primary Examiner.*

J. ADEE, *Assistant Examiner.*